Figure 2:
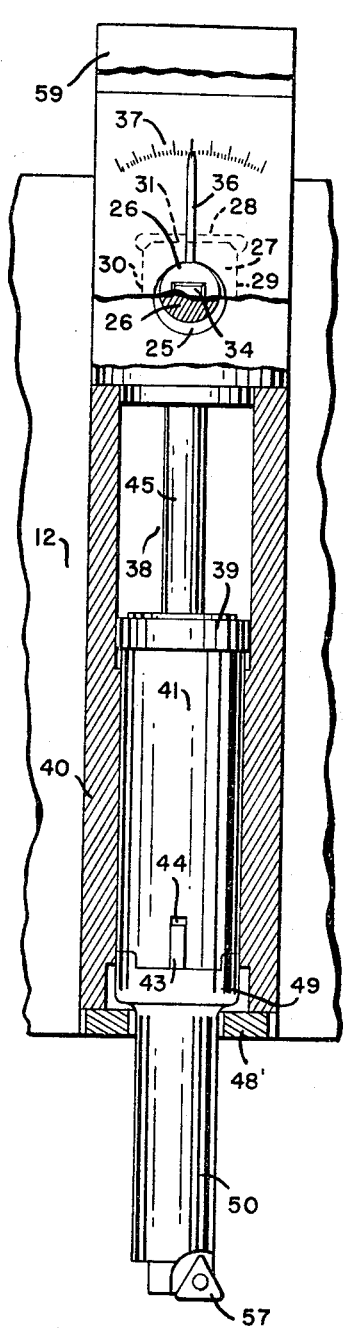

Aug. 30, 1966   E. P. BULLARD III   3,269,222
RETRACTABLE BORING BAR
Filed Aug. 18, 1964

INVENTOR.
EDWARD P. BULLARD III
BY
ATTORNEY.

United States Patent Office 3,269,222
Patented August 30, 1966

3,269,222
RETRACTABLE BORING BAR
Edward P. Bullard III, Fairfield, Conn., assignor to The Bullard Company, Bridgeport, Conn., a corporation of Connecticut
Filed Aug. 18, 1964, Ser. No. 390,389
7 Claims. (Cl. 77—58)

This invention relates to tools for machine tools, and particularly to an improved tool holder for boring bars and the like.

Boring bars by nature comprise a relatively long bar having a cutting tip at the free end thereof. They, as their name implies, are employed to bore holes which require bars of substantial length. When multiple tooling is employed to produce a workpiece in which a boring bar comprises one of the tools mounted on a unitary tool slide, the boring bar often interferes with the movement of the slide to bring other tools into operating position relative to the workpiece.

The principal object of the present invention is to provide a boring bar that can be included as a tool of multiple tooling on a unitary slide, and in which the boring bar will not interfere with the operation of other tools of the multiple tooling.

Another object of the invention is to provide such a boring bar that will be of any desired length.

Still another object of the invention is to provide such a boring bar that will have the capability of being retracted from and extended into a predetermined position with extreme accuracy.

Still another object of the invention is to provide such a boring bar that will include a longitudinal as well as a radial adjustment of the cutting tip of the tool.

In one aspect of the invention, a base member may be provided with fastening means for rigidly mounting it onto a saddle or slide of a machine tool. A boring bar support may include a block attached to said base member by a lower pivotal means and an intermediate means, which latter permits limited arcuate movement of the block relative to the base member.

In another aspect of the invention, the base member may support an eccentric element for limited rotary movement. One portion of the eccentric is journaled in a rectangular shoe that is mounted within a rectangular pocket within the face of the block adjacent the base member. The pocket slidingly fits the shoe on two opposed edges and provides clearance adjacent the other two opposed shoe edges. This permits longitudinal movement of the block relative to the base member and arcuate movement of the block about the lower pivotal means when the eccentric is turned.

In still another aspect of the invention, the block may include a cylinder extending longitudinally thereof, and in which a piston is mounted for reciprocation. The piston may include a portion of slightly less diameter than the piston, which portion extends into a guide cylinder aligned with and comprising an extension of the first-mentioned cylinder. A key within the portion of less diameter rides within keyways in the extension of the cylinder to prevent the piston from turning.

In a further aspect of the invention, a rod may extend longitudinally through the piston to the end of the cylinder and its extension. The rod may be threaded at each end, and a collar integral with the rod may lie against the end of the piston. A boring bar having a female threaded end may be secured onto the threaded end of the rod that extends beyond the cylinder extension and by virtue of the collar, the rod piston and boring bar are rigidly connected together.

In a still further aspect of the invention, the opposite threaded end of the bar may have screwed onto it a nut having an index thereon for cooperation with a scale fixed to the cylinder.

By admitting pressure fluid beneath the piston, it is caused to rise in the cylinder, drawing the boring bar into the cylinder extension; and admitting pressure fluid to the top of the piston forces the boring bar downwardly until the threaded nut contacts the top of the cylinder.

Turning of the nut with pressure fluid above the piston will raise and lower the boring bar to provide limited vertical adjustment of the cutting tip of the boring bar. Turning of the eccentric will cause transverse adjustment of the cutting tip of the boring bar.

The above, other objects and novel features of the improved boring bar will become apparent from the following specification and accompanying drawing which are merely exemplary.

Figure 1:
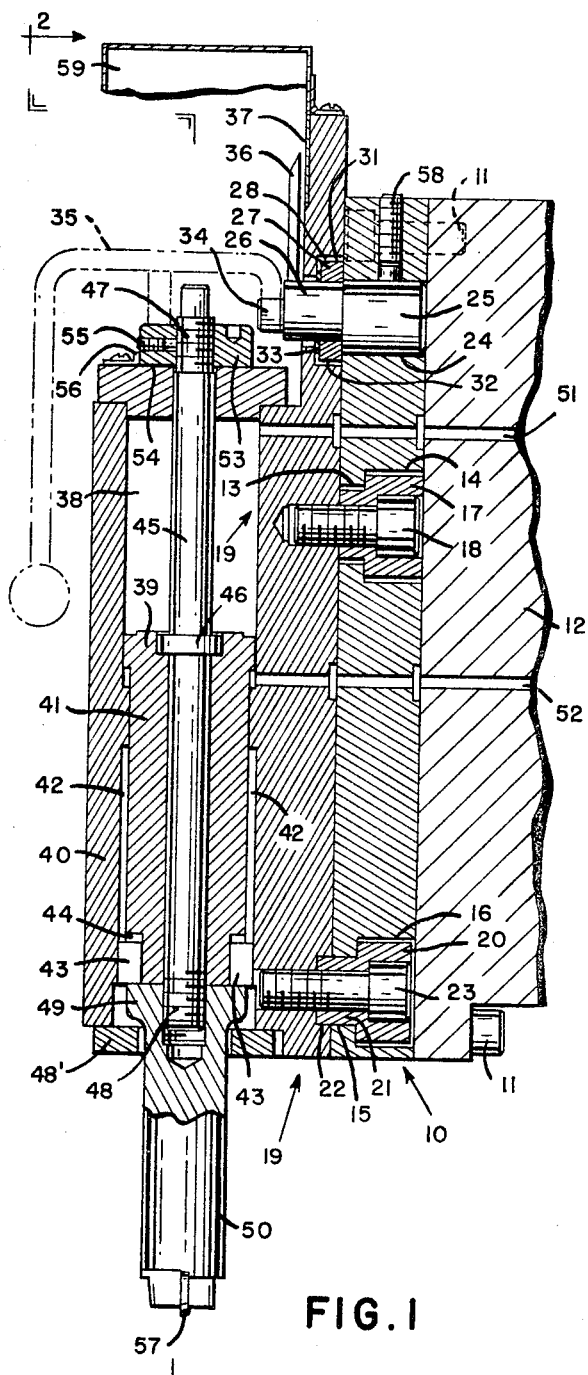

In the drawing:

FIG. 1 is a sectional elevational view of a boring bar to which the principles of the invention have been applied; and FIG. 2 is a sectional elevational view taken substantially along line 2—2 of FIG. 1.

Referring to the drawing, a base 10 may be attached by screws 11 to a saddle or slide 12 of a machine tool. The base 10 may include spaced, aligned, bored and counterbored passages 13, 14 and 15, 16 extending therethrough. The passage 13, 14 receives a cylindrical shouldered element 17, the cylindrical portions of which are of such diameter as to provide clearance between element 17 and the bore 13 and counterbore 14. A screw 18 rigidly fastens element 17 to a block 19 such that frictional force between the shoulder of element 17 and the ledge between bore 13 and counterbore 14 inhibits motion between block 19 and base 10. However, upon said frictional force being overcome,, block 19 is permitted limited motion in any direction by virtue of the clearance between element 17, bore 13 and counterbore 14.

The bore 15 and counterbore 16 receive a shouldered element 20 having a reduced diameter portion 21 that is journaled in bore 15 and extends into and is also journaled in a counterbore 22 aligned with, and of the same diameter as, bore 15. A screw 23 fastens element 20 to base 19 such that block 19 can be pivoted about the axis of screw 23 an amount limited by the clearance between element 17, bore 13 and counterbore 14.

The base 10 includes a hole 24 in which a cylindrical member 25 is journaled. The member 25 includes an integral cylindrical portion 26 that is eccentric to the axis of member 25 and which portion 26 is journaled in a passage within a rectangular shoe 27 that is mounted within a rectangular recess 28 formed in a face of the block 19. The rectangular recess 28 includes two opposed sides 29 and 30 that slidingly receive corresponding opposed sides of shoe 27; and two opposed sides 31, 32 that provide clearance between them and the remaining two sides of shoe 27.

A Belleville spring washer 33 forces shoe 27 against the end of cylinder 25 to maintain the parts in their proper positions. The eccentric 26 is provided with a squared end 34 adapted to receive a wrench 35. A pointer 36 fixed to eccentric 26 cooperates with a scale 37 that is calibrated in a manner to be described later.

The block 19 may include a cylinder 38 within which a piston 39 is mounted for reciprocation. The cylinder 38 may include an aligned extension 40 of a diameter slightly less than that of cylinder 38, and piston 39 may include a portion 41 that is slidingly received within the extension 40. Keyways 42 are located in the wall of extension 40, and keys 43 act between keyways 42 and 44 to prevent the turning of piston 39 and its extension 41 within cylinder 38 and its extension 40.

A rod 45 extends axially through cylinder 38, piston 39 and its extension 41. It includes a collar 46 that abuts the one end of cylinder 38 and threaded ends 47 and 48. The threaded end 49 of a boring bar 50 may be screwed onto threaded end 48 of rod 45 until collar 46 locks the bar 50 to the piston 39. A closure plate 48' may be attached to the lower end of extension 40, and it may include a hole through which the bar 50 passes. Admitting pressure fluid into a line 51 overcomes the force caused by constant pressure fluid in a line 52, thereby forcing piston 39 and bar 50 downwardly until a threaded collar 53 screwed onto threaded end 47 of bar 45 abuts the top surface 54 of cylinder 38. The collar 53 includes a set screw 55 for locking it in adjusted position, and a pointer 56 on cylinder 38 cooperates with a scale on the side of collar 53 that is calibrated in one-thousandth of an inch of vertical displacement of bar 50 and with it, its cutting tip 57. The collar 53 can be turned with a spanner-type wrench.

In order to effect transverse adjustment of the cutting tip, the wrench 35 is employed to turn the eccentric 26 which acts through shoe 27 to overcome the friction between block 19 and base 10 as well as between the element 17 and the shoulder on which it acts to pivot block 19 about the axis of element 20. When the correct adjustment has been effected, a set screw 58 is tightened, locking eccentric 26 in adjusted position. The scale 37 is calibrated in desired units of movement of the cutting tip 57 to produce predetermined diameter changes of the work.

In order to prevent dirt or chips from accumulating between collar 53 and the top of cylinder 38, a housing 59 is provided. It extends from the top of cylinder 38 upwardly to the position shown in the drawing.

From the foregoing it is evident that with pressure fluid admitted to line 51, the boring bar is in the position shown in the drawing, and the tip 57 thereof can be accurately adjusted by operating the collar 53 and eccentric 26. In this position work can be performed. Should it be desired to retract bar 50 so as to prevent interference when using other tools of a multiple tool setup on a workpiece, it is only necessary to exhaust line 51 when the constant pressure fluid in line 52 effects retraction of the bar 50.

Although the various features of the improved boring bar have been shown and described in detail to fully disclose one embodiment of the invention, it will be evident that changes may be made in such details and certain features may be used without others without departing from the principles of the invention.

What is claimed is:

1. In a tool holder for machine tools comprising in combination, a base adapted removably to be attached to a movable member of a machine tool; a block mounted on said base; a cylinder in said block; a piston mounted within said cylinder for reciprocative movement, said piston including a portion of reduced diameter extending outwardly from one end of said cylinder; means for connecting a tool to the extended portion of said piston; and means for supplying pressure fluid to said piston; rod means extending from outside said cylinder inside the same and connected therein to said piston; and collar means threadably adapted to cooperate with a portion of said rod means outside said cylinder to provide vertical adjustment of said piston therein.

2. In a tool holder for machine tools comprising in combination, a base adapted removably to be attached to a movable member of a machine tool; a block pivotally mounted on said base; a cylinder in said block; a piston mounted within said cylinder for reciprocative movement, said piston including a portion of reduced diameter extending outwardly from one end of said cylinder; means for connecting a tool to the extended portion of said piston; means for supplying pressure fluid to said piston; eccentric means for adjusting the pivotal position of said block relative to said base; and rod and collar means for adjusting the vertical position of said piston and tool comprising rod means extending from outside said cylinder inside the same and connected therein to said piston, and collar means threadably adapted to cooperate with a portion of said rod means outside said cylinder to provide vertical adjustment of said piston therein.

3. In a tool holder for machine tools comprising in combination, a base adapted removably to be attached to a movable member of a machine tool; a block mounted on said base; a cylinder in said block; a piston mounted within said cylinder for reciprocative movement, said piston including a portion of reduced diameter extending outwardly from one end of said cylinder; means for connecting a tool to the extended portion of said piston; a rod having threaded ends extending axially through said piston and its extension to points beyond said piston extension and said cylinder; a collar on said rod adapted to abut against said piston when a tool is threaded onto the one end of said rod; a collar threaded onto the other end of said rod for providing vertical adjustment of said tool; and means for supplying pressure fluid to said piston.

4. In a tool holder for machine tools comprising in combination, a base adapted removably to be attached to a movable member of a machine tool; a block mounted on said base; a cylinder in said block; a piston mounted within said cylinder for reciprocative movement, said piston including a portion of reduced diameter extending outwardly from one end of said cylinder; means for connecting a tool to the extended portion of said piston; a rod having threaded ends extending axially through said piston and its extension to points beyond said piston extension and said cylinder; a collar on said rod adapted to abut against said piston when a tool is threaded onto the one end of said rod; a collar threaded onto the other end of said rod for providing vertical adjustment of said tool; means for supplying pressure fluid to said piston; and keys between said piston extension and said cylinder for preventing turning of said piston.

5. A tool holder for machine tools comprising in combination, a base adapted removably to be attached to a movable member of a machine tool; a block pivotally mounted on said base; an eccentric acting between said base and block for providing limited pivotal movement of said block relative to said base; a cylinder in said block; a piston mounted within said cylinder for reciprocative movement, said piston including a portion of reduced diameter extending outwardly from one end of said cylinder; means for connecting a tool to the extended portion of said piston; and means for supplying pressure fluid to said piston.

6. A tool holder for machine tools comprising in comprising in combination, a base adapted removably to be attached to a movable member of a machine tool; a block pivotally mounted on said base; an ecentric mounted for rotary motion in said base and acting on a shoe mounted within a recess in said block, whereby when said eccentric is turned, said block pivots about a point on said base; a cylinder in said block; a piston mounted within said cylinder for reciprocative movement, said piston including a portion of reduced diameter extending outwardly from one end of said cylinder; means for connecting a tool to the extended portion of said piston; and means for supplying pressure fluid to said piston.

7. A tool holder for machine tools comprising in combination, a base adapted removably to be attached to a movable member of a machine tool; a block pivotally mounted on said base; an eccentric mounted for rotary motion in said base and acting on a shoe mounted within a recess in said block, whereby when said eccentric is turned, said block pivots about a point on said base; a cylinder in said block; a piston mounted within said cylinder for reciprocative movement, said piston including a portion of reduced diameter extending outwardly from one end of said cylinder; means for connecting a tool to the extended portion of said piston; a rod having threaded ends extending axially through said piston and its extension to points beyond said piston extension and said cylinder; a collar on said rod adapted to abut against said piston when a tool is threaded onto the one end of said rod; a collar threaded onto the other end of said rod for providing vertical adjustment of said tool; and means for supplying pressure fluid to said piston.

References Cited by the Examiner

UNITED STATES PATENTS 3,011,368  12/1961  Hayes _____ 77—58

WILLIAM W. DYER, Jr., *Primary Examiner.*

GERALD A. DOST, *Examiner.*